(12) United States Patent
Hornfeck et al.

(10) Patent No.: US 7,326,272 B2
(45) Date of Patent: Feb. 5, 2008

(54) SYNTHETIC, DUOLAYER, FILTER ELEMENT

(75) Inventors: Ulrich Hornfeck, Naila (DE); Lothar Popp, Muenchberg (DE); Alexander Obermoser, Berg (DE)

(73) Assignee: Sandler AG, Schwarzenbach/Saale (DE)

( * ) Notice: Subject to any disclaimer, the term of this patent is extended or adjusted under 35 U.S.C. 154(b) by 519 days.

(21) Appl. No.: 10/891,002

(22) Filed: Jul. 15, 2004

(65) Prior Publication Data

US 2005/0011173 A1    Jan. 20, 2005

(30) Foreign Application Priority Data

Jul. 16, 2003    (DE) ................ 103 32 439

(51) Int. Cl.
*B32B 5/16* (2006.01)
(52) U.S. Cl. ............ 55/524; 55/486; 55/522; 55/527; 96/154; 428/331; 428/408; 442/353; 442/346; 442/362; 442/364; 442/417
(58) Field of Classification Search ........... 55/486, 55/524; 96/154; 428/331, 408; 442/353, 442/346, 362, 364, 417
See application file for complete search history.

(56) References Cited

U.S. PATENT DOCUMENTS 4,366,054 A * 12/1982 Kronsbein ............ 210/266
5,445,768 A * 8/1995 Hauber et al. ............ 264/6
5,486,410 A * 1/1996 Groeger et al. ............ 442/353
6,706,086 B2 * 3/2004 Emig et al. ................ 55/486

FOREIGN PATENT DOCUMENTS

| DE | 199 20 983 C2 | 11/2000 |
|---|---|---|
| DE | 199 27 785 C2 | 12/2000 |
| DE | 199 53 717 C2 | 5/2001 |
| DE | 201 18 532 U1 | 3/2002 |
| DE | 202 07 663 U1 | 10/2002 |
| EP | 0 904 819 A1 | 3/1999 |
| EP | 0 910 454 B1 | 4/1999 |
| WO | WO 98/52672 A1 | 11/1998 |

* cited by examiner

*Primary Examiner*—Minh-Chau T. Pham
(74) *Attorney, Agent, or Firm*—Venable LLP; Robert Kinberg; Catherine M. Voorhees

(57) ABSTRACT

A multilayer, pleatable, filter material is made of at least one melt-blown, fleece layer and at least one carded, fleece layer that are attached to one another without use of adhesives for filtering solid particles out of fluids, in particular, filtering solid particles out of gases, where the carded fleece has compacted and uncompacted sections, the melt-blown fleece is preferably attached to the carded fleece at the latter's uncompacted sections by means of multimicrofilament strands, and the filter material contains micropockets for storing dust.

22 Claims, 1 Drawing Sheet

Figure
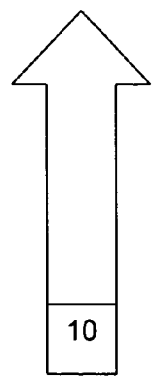
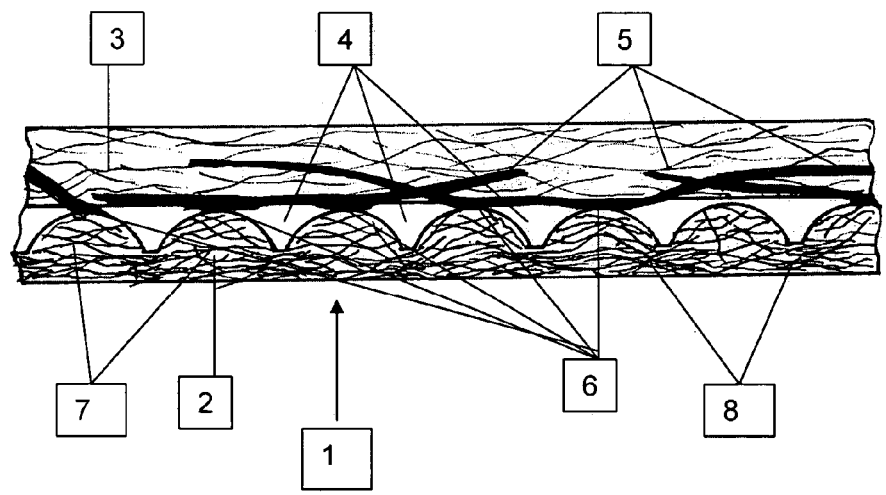
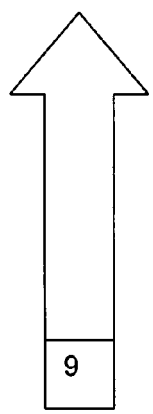

SYNTHETIC, DUOLAYER, FILTER ELEMENT

CROSS-REFERENCE TO RELATED APPLICATION

This application claims the priority of German Patent Application No. 103 32 439.9, filed on Jul. 16, 2003, the subject matter of which is incorporated herein by reference.

BACKGROUND OF THE INVENTION

The present invention concerns a multilayer, pleatable, filter material comprising of at least one melt-blown, fleece layer and at least one carded, fleece layer that are attached to one another without use of adhesives for filtering solid particles out of fluids, in particular, filtering solid particles out of gases.

Modern filter materials of the type in question are subject to various demands, such as employment of a single type of material only, economical manufacture, ready processability, even during folding, adequate mechanical stability during use, maximum attainable airflow rates that are adequate for their intended purposes, combined with efficient filtration, and high capacities for storing dust, i.e., long service lives.

European Patent Application EP 0910454 B1 describes a particle filter in the form of a pleated, laminar, fleece material employed as a room-air filter or an air filter for the interiors of motor vehicles. An unsupported, monolayer, microspun, bonded fleece having a greater fiber density at its downstream face than at its upstream face was proposed as the filtration medium. However, such a monolayer material provides only a low dust-storage capacity; i.e., in the case of monolayer media, longer service lives may be achieved only at the expense of filtration efficiency.

German Patent Application DE 19920983 C2 depicts duolayer or multilayer filtration media for filtering air that employ, for example, star-folded cartridges, pleated panel filters, minipleated cassettes, or flat-panel filters, as filter elements for filtering solid matter out of gases. A coarse, melt-blown layer, whose pores are larger than those of the succeeding layer is situated on the upstream face of the duolayer or multilayer filtration medium. An additional process for attaching the individual layers to one another, for example, by means of ultrasonic welding, thermal welding, or application of adhesives, is required in order that the layers will not shift during pleating. Due to the time and effort involved in their manufacture, such products are expensive, and have thus failed to penetrate the market.

World Patent Application WO 98/52672 A1 describes a pleatable, laminated, composite fleece for use as a filtration medium on automotive air filters. That filtration medium is composed of a high-bulk, fiber mat consisting of staple fleece fibers that has a fiber-density gradient extending across its cross-section, a spun-fleece layer laminated thereto, and a stiffening cover layer. The lamination necessitates an additional processing stage, and the employment of adhesives may cause accumulations of dust in the vicinities of the interfaces of adjacent fleece layers that could block flow through the filter.

German Patent Application DE 20207663 U1 depicts a multilayer-filter assembly for filtering dust out of fluids that comprises a coarse-dust-filtration layer, a fine-dust-filtration layer, and a supporting layer and has a gradient, i.e., fibers whose diameter continuously decreases from the coarse-dust-filtration layer to the fine-dust-filtration layer. Such multilayer-filter assemblies are employed as pouch-type filter bags, pleated filters on filter cassettes for industrial dust filtration, automotive air filters, or large-area exhaust filters on home dust-filtration devices. These types of filters have at least three layers, and are thus more expensive to manufacture.

A pleated filter consisting of a fleece having an assortment of thermoplastic fibers having differing diameters that is laminated onto either a microporous membrane, a porous glass-fiber material, or a long-fiber fleece is known from European Patent Application EP 0904819 A1. However, this type of filter has the disadvantage that it is constructed from various types of materials, which makes disposing of used filters problematical.

German Patent Application DE 19953717 C2 discloses a fluid-permeable, microfiber mat that consists of at least one layer, and is employed in the particulate-filtration field as a filtration medium in the manufacture of filter pouches, planar filter inserts, or folded filter inserts for use on filter cartridges or cassettes. In the event that high filtration efficiencies, combined with high dust-storage capacities, are demanded, they may be achieved only by overlaying several layers of these fiber mats, in which case, the manufacturing process will, once again, be extremely time-consuming and expensive.

SUMMARY OF THE INVENTION

The invention is based on the task of providing a multilayer filter material that will both have individual layers that have been secured against shifting, without employing adhesives, and allow significantly improving dust-storage capacities, while maintaining largely constant airflow rates, while avoiding the disadvantages of the state of the art.

BRIEF DESCRIPTION OF THE DRAWING

The FIGURE depicts a sectioned view of the multilayer filter material according to the invention.

DETAILED DESCRIPTION OF THE INVENTION

As shown in the FIGURE, a multilayer filter material (1) includes a carded fleece (2) arranged on that side thereof facing the upstream direction (9) and a melt-blown fleece (3) on that side thereof facing the downstream direction (10) that is attached to the former without use of adhesives.

The carded fleece (2) has uncompacted sections (7) and compacted sections (8). The uncompacted sections (7), which have a relatively open fiber isotropy, form cushion-like surface structures that are bounded by the compacted sections (8).

Uncompacted sections (7) and compacted sections (8) are obtained by employing a calendering drum engraved with a corresponding pattern running in contact with a smooth-surfaced calendering drum at a defined pressure and defined temperature. In addition to fleece materials that have been set by thermal calendering, hydrodynamically set, staple-fiber, fleece materials or staple-fiber, fleece materials that have been thermally set using hot air may also be employed.

Carded fleece (2) that has been arranged as described above is submitted as a base material for the melt-blowing process. Attachment of the layers occurs in accordance with the theory of German Patent Application DE 20118532 U1.

Formation of the melt-blown fleece (3) occurs in accordance with the method described under German Patent Application DE 19953717 A1. The machine setup on the melt-blowing unit is chosen such that both individual microfibers and assemblages of microfibers, so-called "multimicrofiber strands" (5), will result. Due to their high temperatures, these multimicrofiber strands (5) will still be largely molten when they come into contact with the carded fleece (2), upon which they entwine staple fibers protruding from the carded fleece (2). Fibers protruding at the raised spots coinciding with the cushion-like surface structures of the uncompacted sections (7) within the carded fleece (2) will be entwined by molten multimicrofilament strands (5) during the melt-blowing process and mechanically welded together such that attachment points (6) joining the carded fleece (2) to the melt-blown fleece (3) will result, which will allow bonding the two together without forming a spatially extended interface, and without use of adhesives; i.e., the maximum attainable airflow rate through the multilayer filter material (1) will remain essentially unaffected and blockage of flow by dust trapped between the layers that would cause premature saturation of the filter will be avoided.

Due to the special characteristics of these attachment points (6) uniformly distributed over their surfaces, the individual layers, which will be kinked to varying extents due to the differing physical and mechanical properties of the materials involved, such as their tensile strengths and elongations, will retain freedoms of motion sufficient to accommodate the deformations that occur during the folding process. Uncontrolled, relative shifting of the layers and hazards of delaminations occurring during the pleating process will thus be prevented.

Numerous micropockets (4) that are capable of accommodating dust particles will form between the melt-blown fleece (3) and the surface-textured, carded fleece (2), which will significantly increase the dust-storage capacity of the multilayer filter material (1), without reducing the pressure drop across the latter by much.

In addition, it has, surprisingly, been found that, when air flows through it, the prefiltration layer consisting of the carded fleece (2) is able to free itself from dust and the entrained dust is able to correspondingly readily deposit itself in the micropockets (4) due to vibrations of the prefiltration and fine-filtration layers resulting from turbulences occurring between the layers.

The filter material (1) according to the invention is distinguished by its excellent processability during the folding process, combined with optimized airflow data and a significantly improved dust-storage capacity compared to known filter materials from the state of the art.

The invention will now be described, based on the following sample embodiment.

Materials employed in configuring the multilayer filter material (1) according to the invention:

Carded fleece (2): Carded, thermoset, stable-fiber fleece; weight per unit area: 39.1 g/m$^2$ Melt-blown fleece (3): Microfiber fleece material, manufactured according to the melt-blowing process; weight per unit area: 120 g/m$^2$ Table 1 lists the major physical properties of the carded fleece (2), the melt-blown fleece (3), and the multilayer filter material (1) according to the invention.

TABLE 1

|  | Carded fleece (2), manufactured from 100% PP-fibers, 2.2 dtex, 40-mm staple length | Melt-blown fleece (3), manufactured from 100% PP-granulate, Borflow HL508FB | Multilayer filter material (1) |
|---|---|---|---|
| Weight per unit area, per EN 29073-1 | 39.1 g/m$^2$ | 120.0 g/m$^2$ | 159.1 g/m$^2$ |
| Longitudinal tensile strength, per EN 29073-3 | 21.69 N | 19.43 N | — |
| Lateral tensile strength, per EN 29073-3 | 3.84 N | 18.82 N | — |
| Longitudinal elongation, per EN 29073-3 | 64.80% | 5.50% | — |
| Lateral elongation, per EN 29073-3 | 123.80% | 11.10% | — |
| Thickness under an applied pressure of 0.05 N/cm$^2$, per EN ISO 9073-2 | 0.48 mm | 0.89 mm | 1.27 mm |
| Maximum attainable airflow rate at a pressure drop of 200 Pa, per EN ISO 9237 | >3,000 l/m$^2$-s | 1,060 l/m$^2$-s | 600 l/m$^2$-s |
| Longitudinal layer adhesion, per DIN 53539 | — | — | 0.38 N |
| Lateral layer adhesion, per DIN 53539 | — | — | 0.21 N |

Table 2 illustrates the differences in the dust-trapping capacities of the monolayer, melt-blown filter material and the filter material (1) according to the invention.

TABLE 2

| Type of Filter Material | Monolayer, Melt-Blown | Multilayer (1) | Monolayer, Melt-Blown | Multilayer (1) |
|---|---|---|---|---|
| Internal Designation | 8336 - 170 g/m$^2$ F6 Filter | 8346 - 170 g/m$^2$ F6 Filter | 8337 - 170 g/m$^2$ F7 Filter | 41033FI60 - 170 g/m$^2$ F7 Filter |
| ASHRAE Standard 18532 | 150 g | 215 g (+70%) | 100 g | 166 g (+66%) |

Manufacture of the filter material (1) consisting of the individual layers (2) and (3) proceeds as follows.

The carded fleece (2) is manufactured from 100-% polypropylene staple fibers having a fineness of 2.2 dtex and a staple length of 40 mm using known carding processes and subsequently subjected to a run through a calendering press. The employment of a calendering drum engraved with a corresponding pattern running in contact with a smooth-surfaced calendering drum at a defined pressure and defined temperature yields uncompacted sections (7) and compacted sections (8) within the carded fleece (2). Protruding staple fibers that are predestined to form the desired attachment points (6) to the multimicrofilament strands (5) of the melt-blown fleece (3), particularly on the raised surfaces of the uncompacted sections (7), occur within the uncompacted sections (7) of the carded fleece (2) due to the open fleece structure within those sections. The carded fleece (2) acts as a carrier material during the melt-blowing process. The multilayer filter material (1) is formed using the melt-blowing process, where the carrier material is run over a collector drum in order that the melt-blown fibers will collect on the structured surface of the carded fleece (2).

The machine setup on the melt-blowing unit is chosen such that both individual microfibers and assemblages of microfibers, so-called "multimicrofiber strands" (5), will form. These multimicrofiber strands (5) have such high temperatures that they are still largely molten when they come into contact with the carded fleece (2), entwine staple fibers protruding from the uncompacted sections (7) thereof, and attachment points (6) joining the carded fleece (2) to the melt-blown fleece (3) arise following cooling. This particular configuration of the attachment points allows dispensing with employment of adhesives, which would generate an undesirable interface layer.

The multilayer filter material according to the invention is particularly well-suited to use on industrial heating, ventilation, and air-conditioning systems, for pleated filters, and cassette filters, and for automotive air filters.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A multilayer filter material comprising:
at least one melt-blown fleece; and
at least one carded fleece attached to said at least one melt-blown fleece without use of adhesives, wherein the at least one carded fleece has compacted sections and uncompacted sections, the at least one melt-blown fleece is attached to the carded fleece at the latter's uncompacted sections by means of multimicrofilament strands, and the multilayer filter material contains micropockets.

2. The multilayer filter material according to claim 1, wherein the at least one carded fleece includes staple, thermoplastic-polymer fibers.

3. The multilayer filter material according to claim 1, wherein the at least one carded fleece comprises layers of staple fibers including polymers chosen from the group of the polyolefins.

4. The multilayer filter material according to claim 1, wherein the at least one carded fleece comprises staple fibers including polymers chosen from the group of the polyesters.

5. The multilayer filter material according to claim 1, wherein the at least one carded fleece comprises staple fibers including polymers chosen from the group of the polyamides.

6. The multilayer filter material according to claim 1, wherein the at least one carded fleece comprises staple fibers whose fineness falls within the range 0.9 dtex to 12.0 dtex, inclusive.

7. The multilayer filter material according to claim 1, wherein the at least one carded fleece has a weight per unit area falling within the range 20 $g/m^2$ to 100 $g/m^2$, inclusive.

8. The multilayer filter material according to claim 1, wherein the carded fleece has a thickness falling within the range 0.2 mm to 1.5 mm, inclusive.

9. The multilayer filter material according to claim 1, wherein the compacted sections and uncompacted sections are incorporated into the at least one carded fleece using an embossing drum, under the action of pressure and heat.

10. The multilayer filter material according to claim 1, wherein the compacted sections and uncompacted sections are incorporated into the at least one carded fleece by thermofusion employing a textured drum.

11. The multilayer filter material according to claim 1, wherein the compacted sections and uncompacted sections are incorporated into the at least one carded fleece hydrodynamically, employing a textured drum.

12. The multilayer filter material according to claim 1, wherein the maximum attainable airflow rate through the at least one carded fleece (2) falls within the range 1,500 $l/m^2$-s to 6,000 $l/m^2$-s.

13. The multilayer filter material according to claim 1, wherein the staple fibers of the at least one carded fleece have been provided with an antimicrobial additive.

14. The multilayer filter material according to claim 1, wherein the individual filaments and multimicrofilament strands of the at least one melt-blown fleece comprise thermoplastic polymers.

15. The multilayer filter material according to claim 1, wherein the at least one melt-blown fleece is made of thermoplastic plastic and the thermoplastic plastic is chosen from the groups of the polyolefins, the polyesters, or the polyamides.

16. The multilayer filter material according to claim 1, wherein the at least one melt-blown fleece has a thickness falling within the range 0.4 mm to 2.5 mm, inclusive.

17. The multilayer filter material according to claim 1, wherein the at least one melt-blown fleece has a weight per unit area falling within the range 50 $g/m^2$ to 120 $g/m^2$, inclusive.

18. The multilayer filter material according to claim 1, wherein the maximum attainable airflow rate through the at least one melt-blown fleece falls within the range 300 $l/(m^2 xs)$ to 2,000 $l/(m^2 xs)$.

19. The multilayer filter material according to claim 1, wherein the multimicrofilament strands of the at least one melt-blown fleece have been provided with an antimicrobial additive.

20. The multilayer filter material according to claim 1, wherein the at least one carded fleece and the at least one melt-blown fleece are made of the same polymer material.

21. Employment of a multilayer filter material as an air filter on a room heating, ventilation, or air-conditioning system, wherein the multilayer filter material comprises at least one melt-blown fleece and at least one carded fleece attached to the at least one melt-blown fleece without use of adhesives, the at least one carded fleece has compacted sections and uncompacted sections, the at least one melt-blown fleece is attached to the carded fleece at the latter's uncompacted sections by means of multimicrofilament strands, and the multilayer filter material contains micropockets.

22. A pleated filter whose walls include a multilayer filter material, wherein the multilayer filter material comprises at least one melt-blown fleece and at least one carded fleece attached to the at least one melt-blown fleece without use of adhesives, the at least one carded fleece has compacted sections and uncompacted sections, the at least one melt-blown fleece is attached to the at least one carded fleece at the latter's uncompacted sections by means of multimicrofilament strands, and the multilayer filter material contains micropockets.

* * * * *